(12) United States Patent
Thomas et al.

(10) Patent No.: US 10,641,120 B2
(45) Date of Patent: May 5, 2020

(54) SEAL SEGMENT FOR A GAS TURBINE ENGINE

(71) Applicants: Rolls-Royce Corporation, Indianapolis, IN (US); Rolls-Royce North America Technologies, Inc., Indianapolis, IN (US)

(72) Inventors: David John Thomas, Brownsburg, IN (US); Ted Joseph Freeman, Danville, IN (US); Joseph Pan Lamusga, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 584 days.

(21) Appl. No.: 15/219,047

(22) Filed: Jul. 25, 2016

(65) Prior Publication Data

US 2017/0022840 A1  Jan. 26, 2017

Related U.S. Application Data

(60) Provisional application No. 62/196,532, filed on Jul. 24, 2015.

(51) Int. Cl.
*F01D 11/08* (2006.01)
*F02C 7/12* (2006.01)

(52) U.S. Cl.
CPC ............... *F01D 11/08* (2013.01); *F02C 7/12* (2013.01); *F05D 2240/11* (2013.01); *F05D 2260/941* (2013.01); *F05D 2300/2261* (2013.01); *F05D 2300/6012* (2013.01); *F05D 2300/6033* (2013.01)

(58) Field of Classification Search
CPC .......... F01D 11/18; F01D 11/24; F01D 11/08; F01D 11/12; F01D 11/125; F01D 11/14; F01D 11/16; F01D 11/20; F01D 9/041; F05D 2240/11
See application file for complete search history.

(56) References Cited

U.S. PATENT DOCUMENTS

| 4,329,113 | A | * | 5/1982 | Ayache | F01D 11/18 |
| | | | | | 415/116 |
| 4,679,981 | A | * | 7/1987 | Guibert | F01D 11/08 |
| | | | | | 415/116 |
| 5,374,161 | A | | 12/1994 | Kelch et al. | |
| 5,584,651 | A | | 12/1996 | Pietraszkiewicz et al. | |

(Continued)

FOREIGN PATENT DOCUMENTS

| EP | 0694677 | 1/1996 |
| EP | 1676981 | 5/2006 |

(Continued)

OTHER PUBLICATIONS

Search report in related EPO application No. 16181102, dated Dec. 1, 2016, 9 pgs.

*Primary Examiner* — Eldon T Brockman
(74) *Attorney, Agent, or Firm* — Faegre Drinker Biddle & Reath LLP (57) ABSTRACT

A seal segment for a gas turbine engine has a radially outer wall with a first length, a radially inner wall with a second length, and a rib member which extends radially between the outer wall and the inner wall and along the first and second lengths.

21 Claims, 5 Drawing Sheets

(56) References Cited

U.S. PATENT DOCUMENTS

| | | | |
|---|---|---|---|
| 6,884,026 B2 | 4/2005 | Glynn et al. | |
| 6,993,150 B2 | 1/2006 | Haynes | |
| 7,517,189 B2* | 4/2009 | Camus | F01D 9/04 |
| | | | 415/173.1 |
| 7,726,936 B2 | 6/2010 | Keller et al. | |
| 7,950,234 B2 | 5/2011 | Radonovich et al. | |
| 8,118,546 B2 | 2/2012 | Morrison | |
| 8,137,056 B2* | 3/2012 | Fujimoto | F01D 11/24 |
| | | | 415/116 |
| 8,246,299 B2* | 8/2012 | Razzell | F01D 11/005 |
| | | | 415/173.1 |
| 8,740,552 B2 | 6/2014 | Marusko et al. | |
| 8,863,527 B2 | 10/2014 | Holcomb et al. | |
| 8,905,709 B2 | 12/2014 | Dziech et al. | |
| 9,068,472 B2* | 6/2015 | Rawlinson | F01D 11/122 |
| 2006/0140753 A1* | 6/2006 | Romanov | F01D 11/08 |
| | | | 415/173.1 |
| 2007/0041827 A1* | 2/2007 | Camus | F01D 9/04 |
| | | | 415/116 |
| 2009/0053042 A1 | 2/2009 | Wilson et al. | |
| 2010/0047061 A1* | 2/2010 | Morrison | F01D 9/04 |
| | | | 415/173.1 |
| 2012/0219401 A1* | 8/2012 | Rawlinson | F01D 11/122 |
| | | | 415/115 |
| 2012/0260670 A1 | 10/2012 | Foster et al. | |
| 2013/0156550 A1 | 6/2013 | Franks et al. | |

FOREIGN PATENT DOCUMENTS

| | | |
|---|---|---|
| EP | 2378088 | 10/2011 |
| EP | 2479385 | 7/2012 |
| EP | 2589774 | 5/2013 |
| EP | 2631434 | 8/2013 |
| FR | 2857406 | 1/2005 |
| GB | 1352485 | 5/1974 |

* cited by examiner

SEAL SEGMENT FOR A GAS TURBINE ENGINE

CROSS-REFERENCE TO RELATED APPLICATIONS

The present application claims the benefit of priority from U.S. Patent Application Ser. No. 62/196,532, filed on Jul. 24, 2015, which is incorporated herein by reference in its entirety.

FIELD OF THE DISCLOSURE

The present disclosure relates to ceramic matrix composite materials and structures for gas turbine engines.

BACKGROUND OF THE PRESENT DISCLOSURE

Gas turbine engines generally include an outer casing for housing at least one compressor, at least one turbine, a combustion chamber, a rotor, and other components. During operation of the gas turbine engine, these components of the engine are exposed to high-temperature and high-pressure environments. To seal the heat and pressure generated during operation of the engine within the outer casing, a seal or shroud may be provided around various components of the engine. For example, a seal may extend annularly around the turbine portion of the engine.

However, the seal experiences thermal and/or pressure loading due to the high operating temperatures and pressures within the turbine. The thermal and/or pressure loads may decrease the integrity of the seal by introducing stresses into the material of the seal and/or affecting the connection of the seal to any additional component of the engine. Therefore, there is a need for decreasing stresses exerted on the seal during operation of the engine.

SUMMARY OF DISCLOSED EMBODIMENTS OF THE PRESENT DISCLOSURE

The present disclosure relates to an annular seal segment for a gas turbine engine which includes a cross-section and a rib positioned within the cross-section. The seal segment is exposed to high thermal and pressure loads during operation of the engine and, as such, stresses may be exerted on the seal segment. To decrease stress on the seal segment, the radially-extending rib is positioned along a width of the seal segment to decrease the moment arm of the pressure loading on the seal segment.

In one exemplary embodiment of the present disclosure, a gas turbine engine comprises a housing, at least one compressor positioned within the housing, and at least one turbine operably coupled to the at least one compressor and including a plurality of blades extending radially from a longitudinal axis of the engine. The engine further comprises a seal segment positioned along a portion of the housing and comprising a radially outer wall having a first length extending annularly around a portion of the engine, a radially inner wall positioned intermediate the outer wall and the portion of the engine and having a second length, and a rib member extending between the outer wall and the inner wall and along the first and second lengths.

In another exemplary embodiment of the present disclosure, a gas turbine engine comprises a housing, at least one compressor positioned within the housing, and at least one turbine operably coupled to the at least one compressor and including a plurality of blades extending radially from a longitudinal axis of the engine. Additionally, the engine comprises a seal segment positioned along a portion of the housing and comprising a radially outer wall, a radially inner wall positioned intermediate the outer wall and at least one of the at least one compressor or the at least one turbine, a first lateral wall extending between the outer and inner walls, and a second lateral wall extending between the outer and inner walls. Additionally, the seal segment comprises a rib member extending between the outer wall and the inner wall. A first cooling passage is bounded by the outer wall, the inner wall, the rib member, and the first lateral wall, and a second cooling passage is bounded by the outer wall, the inner wall, the rib member, and the second lateral wall.

In a further embodiment of the present disclosure, a gas turbine engine comprises a housing, at least one compressor positioned within the housing, and at least one turbine operably coupled to the at least one compressor and including a plurality of blades extending radially from a longitudinal axis of the engine. Additionally, the engine comprises a seal segment positioned along a portion of the housing and comprising a radially outer wall, a radially inner wall positioned intermediate the outer wall and the blades of the turbine, a first lateral wall extending between the outer and inner walls, and a second lateral wall extending between the outer and inner walls. The seal segment further comprises a rib member extending between the outer wall and the inner wall. The outer wall, the inner wall, the rib member, and the first lateral wall define a first cross-section of the seal segment, and the outer wall, the inner wall, the rib member, and the second lateral wall define a second cross-section of the seal segment.

Additional embodiments encompass some or all the foregoing features, arranged in any suitable combination. Certain embodiments of the present disclosure may include some, all, or none of the above advantages. One or more other technical advantages may be readily apparent to those skilled in the art from the figures, descriptions, and claims included herein.

The features and advantages of the present disclosure will become more readily appreciable from the following detailed description when taken in conjunction with the accompanying drawings.

BRIEF DESCRIPTION OF THE DRAWINGS

The detailed description of the drawings particularly refers to the accompanying figures in which.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the claims in any manner.

DETAILED DESCRIPTION

For the purposes of promoting an understanding of the principles of the disclosure, reference will now be made to the embodiments illustrated in the drawings, which are described below. The embodiments disclosed below are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended unless specifically stated. Except where a contrary intent is expressly stated, terms are used in their singular form for clarity and are intended to include their plural form.

Figure 1:
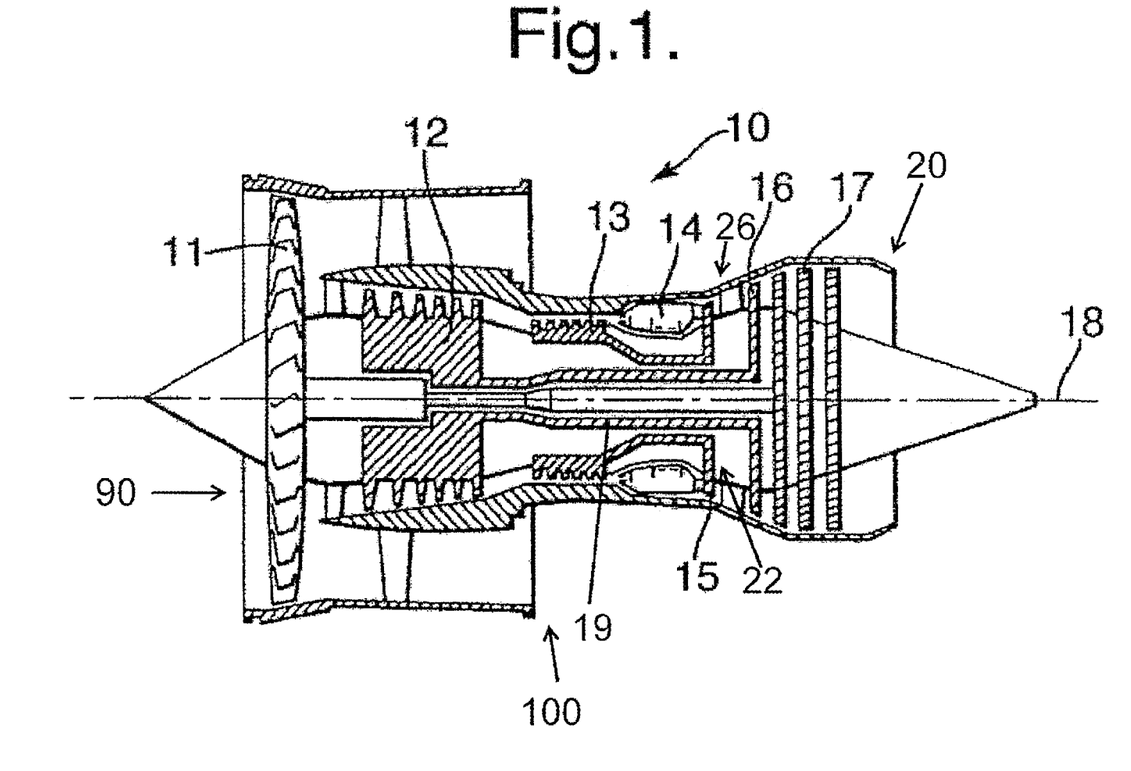
FIG. 1 is a cross-sectional view of an exemplary gas turbine engine of the present disclosure.

With reference to FIG. 1, an exemplary gas turbine engine 10 includes a housing 100 which generally surrounds a propulsive fan 11, an intermediate pressure compressor 12, a high pressure compressor 13, a combustion portion 14, a high pressure turbine 15, an intermediate pressure turbine 16, and a low pressure turbine 17. Turbines 15, 16, 17 are operably coupled to compressors 12, 13 and propulsive fan 11 by at least one concentric shaft 19 which extends along a longitudinal axis 18 of engine 10.

During operation of engine 10, air is compressed by fan 11 and divided into a first flow which bypasses engine 10 to provide propulsive thrust and a second flow which enters intermediate pressure compressor 12. Intermediate pressure compressor 12 compresses the air from the second flow before the air flows into high pressure compressor 13. In high pressure compressor 13, the air is further compressed and then directed into combustion portion 14 where the air is mixed with fuel for combustion. The resultant combustion products then expand through, and thereby drive, turbines 15, 16, 17. Gas byproducts are then exhausted from a downstream end 20 of engine 10 to provide additional propulsive thrust.

Referring to FIGS. 2-5, high pressure turbine 15 includes an annular array of radially extending rotor vanes or blades 22. Blades 22 are configured to rotate about longitudinal axis 18 during operation of engine 10. A shroud ring or liner portion 26 of housing 100 extends annularly around blades 22 and is positioned radially outward of blades 22. Additionally, liner 26 may be positioned around other components of engine 10. Liner 26 includes at least one seal segment 28 and, illustratively, may include a plurality of seal segments 28 arranged annularly around blades 22. In one embodiment, seal segments 28 may be integrally formed with each other to define a single, monolithic annular seal. Alternatively, seal segments 28 may be separate components grouped together to define liner 26.

Figure 2:
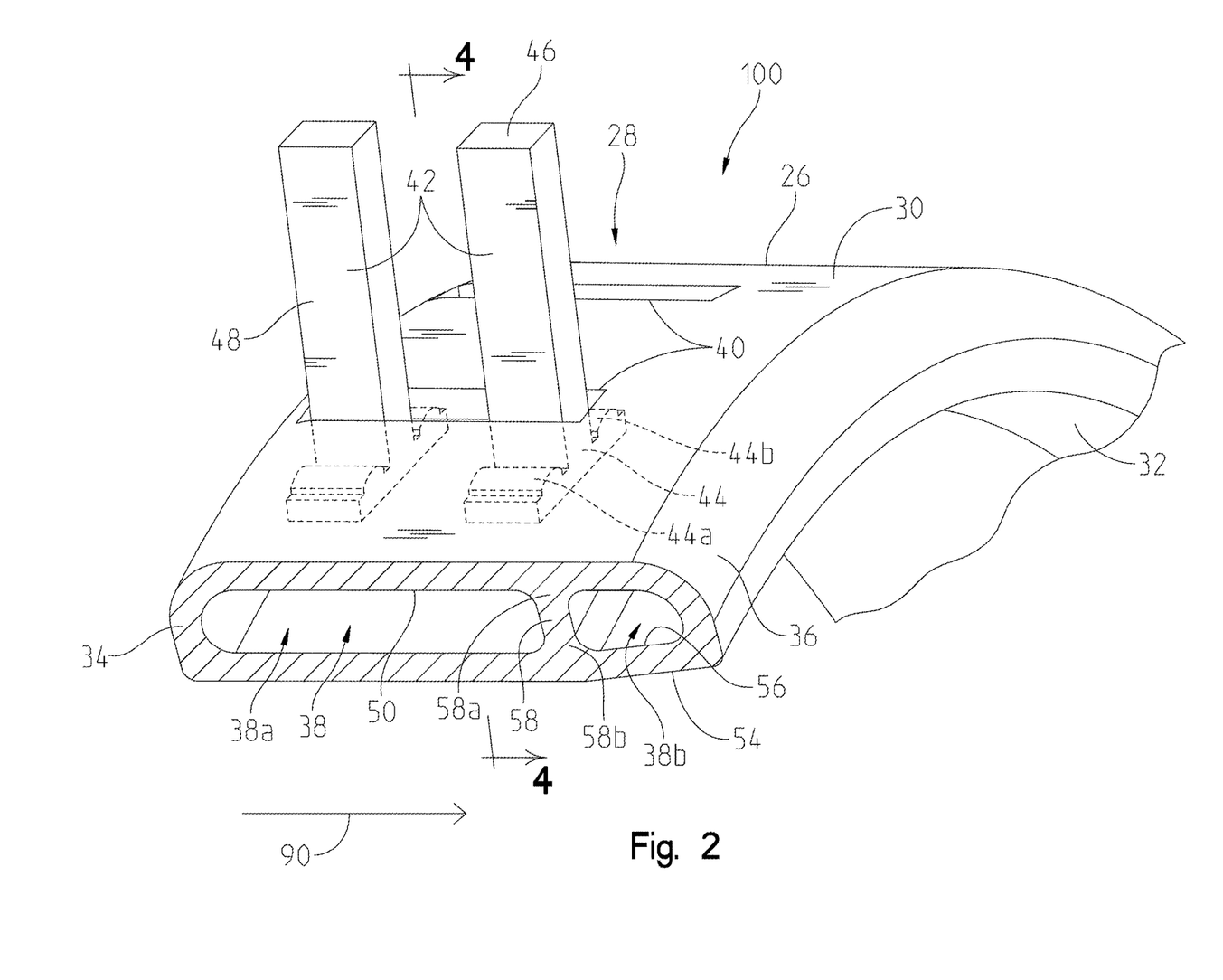
FIG. 2 is a perspective view of a portion of a seal segment of the gas turbine engine of FIG. 1 and at least one connector extending from seal segment.

As shown in FIGS. 2-5, seal segment 28 includes a radially outer wall 30, a radially inner wall 32, a first lateral wall 34 extending between outer wall 30 and inner wall 32, and a second lateral wall 36 extending between outer wall 30 and inner wall 32. Inner wall 32 is positioned radially intermediate outer wall 30 and blade 22. Illustratively, seal segment 28 generally defines an elongate cross-section which generally encloses an internal volume 38. The elongate cross-section may have a substantially rectangular shape. The substantially rectangular shape may comprise rounded corners at least at one end thereof. First and second lateral walls 34, 36 may cooperate with outer and inner walls 30, 32 to define 90° angles. Alternatively, first and second lateral walls 34, 36 may cooperate with outer and inner walls 30, 32 to define rounded corners of seal segment 28. Second lateral wall 36 is downstream of first lateral wall 34 in a direction 90 of gas (e.g., air) flow through engine 10 (FIGS. 1 and 2).

Figure 3:
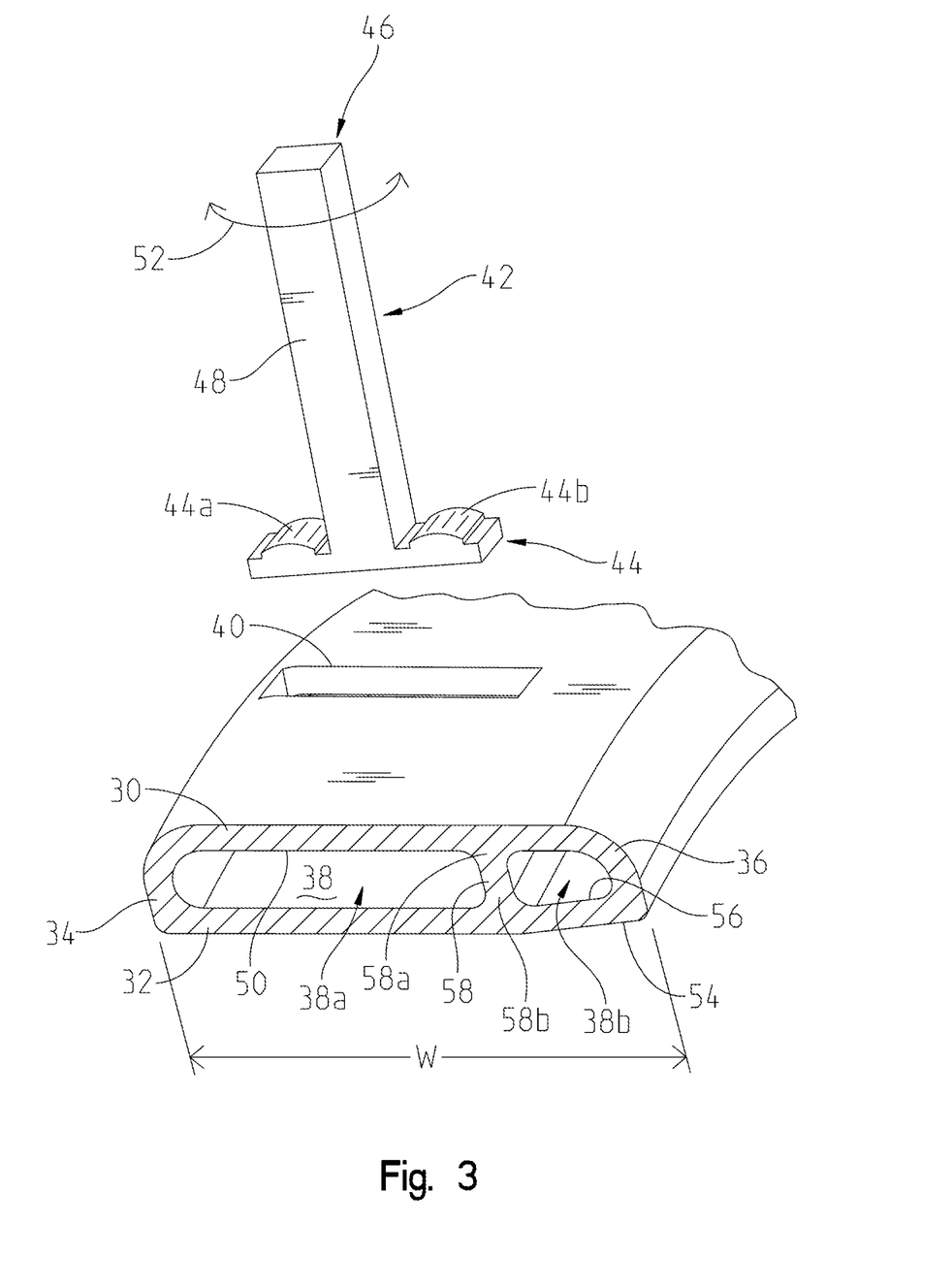
FIG. 3 is an exploded view of the connector and seal segment of FIG. 2.
Figure 4:
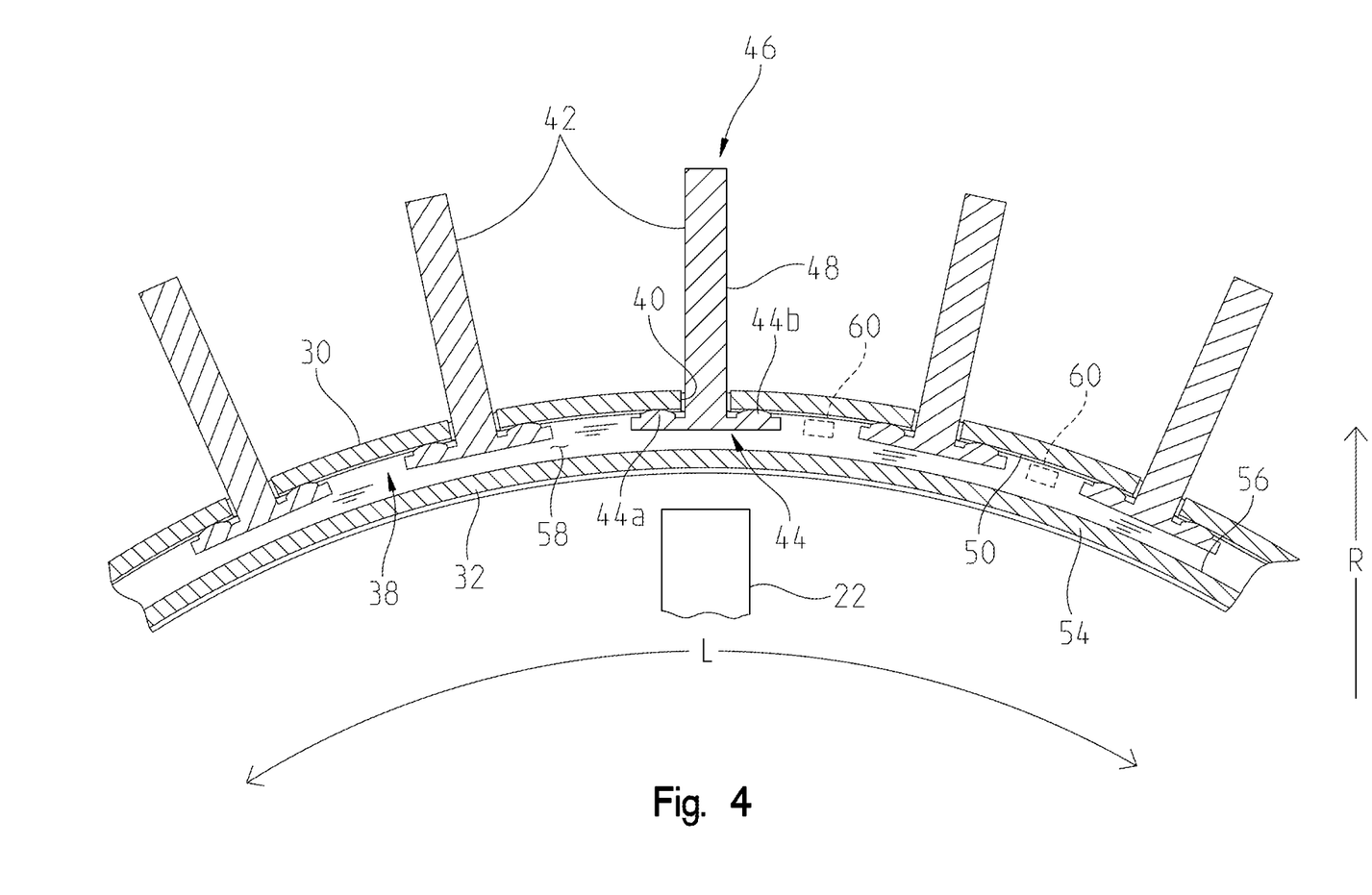
FIG. 4 is a cross-sectional view of the seal segment and connector of FIG. 2, taken along line 4-4 of FIG. 2.

Referring to FIGS. 2-4, outer wall 30 includes a plurality of through apertures 40. Illustratively, apertures 40 extend along a width W (FIG. 3) of seal segment 28 to define slots for receiving at least one connector member, or connector, 42. Connectors 42 include an outer end 46 which is configured to couple with additional components of engine 10. Additionally, connectors 42 include an inner end 44 which is joined with outer end 46 through a connector shaft 48. Inner end 44 is received through aperture 40 and is positioned within internal volume 38. Inner end 44 of connector 42 extends generally perpendicularly to connector shaft 48 such that connector 42 generally defines an elongated, upside-down "T" shape.

As shown in FIGS. 2-4, when connectors 42 are positioned through apertures 40, inner end 44 extends perpendicularly to width W (FIG. 3) of seal segment 28 such that a first portion 44a of inner end 44 is positioned along a first side of aperture 40 and a second portion 44b of inner end 44 is positioned along a second side of aperture 40. More particularly, first and second portions 44a, 44b generally straddle aperture 40 and are retained along an inner surface 50 of outer wall 30. To remove connectors 42 from seal segment 28, connectors 42 are rotated approximately 90° in direction 52 (FIG. 3) such that first and second portions 44a, 44b of inner end 44 are aligned with width W (FIG. 3) of seal segment 28. As such, first and second portions 44a, 44b are aligned with the orientation of aperture 40 and connector 42 may be pulled radially outward from seal segment 28. Similarly, to position connector 42 within seal segment 28, first and second portions 44a, 44b are aligned with the orientation of aperture 40 and pushed radially inward through aperture 40. Once first and second portions 44a, 44b are positioned within internal volume 38, connectors 42 are rotated approximately 90° in direction 52 (FIG. 2) to position first and second portions 44a, 44b on opposite ends of aperture 40.

Figure 5:
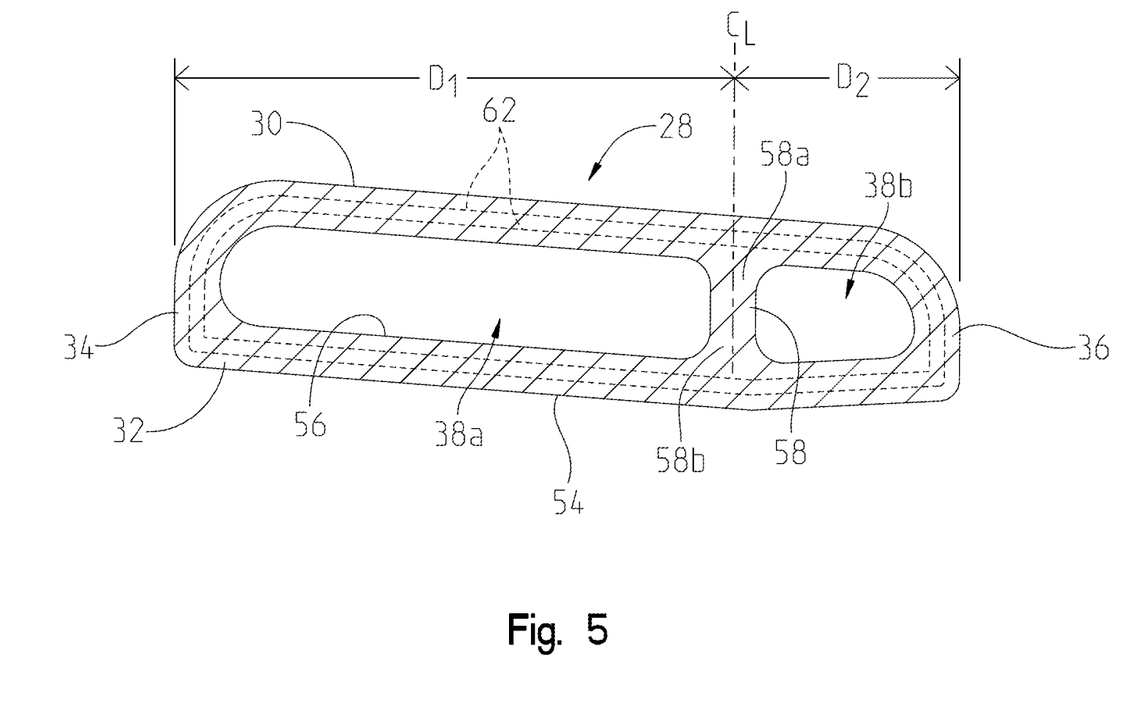
FIG. 5 is a radial cross-sectional view of another embodiment of the seal segment of FIG. 2.

Inner wall 32 of seal segment 28 defines a radially innermost surface of liner 26 and is positioned radially adjacent blades 22 of turbine 15. Inner wall 32 of seal segment 28 is exposed to high temperatures during operation of engine 10 due to the turbine gases flowing along inner wall 32. Consequently, at least inner wall 32 is comprised of an insulating material capable of withstanding high temperatures without adverse effects on the integrity of the material comprising inner wall 32. In one embodiment, inner wall 32 may be comprised of a ceramic material. For example, inner wall 32 may be comprised of a ceramic matrix composite ("CMC") material, such as those comprised of silicon carbide fibers enclosed in a silicon carbide matrix. Additionally, outer wall 30, first lateral wall 34, and second lateral wall 36 may be comprised of an insulating material, for example a ceramic material, such as CMC. Alternatively, seal segment 28 may be comprised of a plurality of layers of fabric 62, as shown in FIG. 5. Each consecutive layer of fabric 62 may be wrapped around the previous layer of insulating fabric 62 and joined together through a pressure and/or heat treatment process (e.g., molding). In one variation, seal segment 28 comprises a three-dimensional woven structure. The three-dimensional woven structure may comprise of a three-dimensional CMC structure.

To decrease the temperature of inner wall 32, cooling gases may be provided through internal volume 38. Because a radially outer surface 56 of inner wall 32 is exposed to the cooling gases and a radially inner surface 54 of inner wall 32 is exposed to the high-temperature gases flowing through turbine 15, a temperature differential is created across inner wall 32. Additionally, a pressure differential is created across seal segment 28 due to cooler gas supplied at higher pressure through internal volume 38 than hotter gas flowing along inner surface 54 of inner wall 32. As such, inner wall 32 is exposed to thermal and pressure loads. Furthermore, a pressure gradient along inner wall 32 increases from first lateral wall 34 to second lateral wall 36 such that second lateral wall 36 is exposed to greater pressure loading than first lateral wall 34.

Because seal segment 28 is exposed to varying pressures and temperatures, radial and/or other forces may be exerted on seal segment 28 and particularly at second lateral wall 36. The forces exerted on seal segment 28 may affect both the integrity of the material comprising seal segment 28 and also weaken the coupling between connectors 42 and other components of engine 10.

Referring to FIG. 5, to decrease the force exerted on seal segment 28 at second lateral wall 36, a septum, rib member, or rib, 58 is provided within internal volume 38 of seal segment 28. Rib 58 extends between outer wall 30 and inner wall 32 such that a radially outer end 58a of rib 58 is joined with inner surface 50 of outer wall 30 and a radially inner end 58b of rib 58 is joined with outer surface 56 of inner wall 32. In one embodiment, rib 58 is integrally formed with outer wall 30 and inner wall 32.

Rib 58 divides internal volume 38 into a first, or forward, cavity 38a and a second, or aft, cavity 38b. Cooling gas flows through cavities 38a, 38b to cool inner wall 32. However, as shown in FIG. 5, rib 58 does not bisect internal volume 38 evenly but rather is positioned closer to second lateral side 36 than first lateral side 34. In this way, first cavity 38a has a larger volume than second cavity 38b. More particularly, a distance $D_1$ from first lateral wall 34 to a centerline $C_L$ of rib 58 is greater than a distance $D_2$ from centerline $C_L$ of rib 58 to second lateral wall 36. The area of the cross-section of first cavity 38a is smaller than the area of the cross-section of second cavity 38b. The cross-sections may be substantially rectangular, and the substantially rectangular cross-sections may have rounded corners. The placement of rib 58 between outer wall 30 and inner wall 32 may be adjusted to accommodate different loading parameters on seal segment 28. Additionally, rib 58 does not longitudinally overlap any of apertures 40 along a length L of seal segment 28 (FIG. 4). It is to be understood that length L denotes the full annular length of seal segment 28 and only a portion of both seal segment 28 and length L are shown in FIG. 4.

As shown in FIG. 4, rib 58 may extend continuously along length L of seal segment 28. Alternatively, rib 58 may include a plurality of openings 60 defining gas flow passages through rib 58 for cooling gas to flow between cavities 38a, 38b. In a further embodiment, rib 58 may include a plurality of discontinuous rib segments (not shown) positioned at spaced intervals along length L (FIG. 4) of seal segment 28.

Rib 58 is configured to decrease stress within seal segment 28 caused by the thermal and pressure loads exerted thereon. More particularly, by positioning rib 58 closer to second lateral wall 36, the wall at which the greatest pressure is exerted on seal segment 28 due to downstream pressures within engine 10, rib 58 decreases the moment arm of the pressure loading and reduces radial stresses in seal segment 28. For example, the moment arm of the pressure loading may extend from approximately first lateral wall 34 to second lateral wall 36. Therefore, by positioning rib 58 closer to second lateral wall 36, the moment arm of the pressure loading on seal segment 28 is reduced. Additionally, because cooling gases flow through first and second cavities 38, 38b but hotter gases flow along inner surface 54 of inner wall 32, seal segment 28 may be exposed to stresses causes by radial expansion and/or contraction in radial direction R (FIG. 4). However, rib 58 increases the radial stiffness of seal segment 28 in radial direction R to maintain the radial distance between outer wall 30 and inner wall 32.

In a variation of the present embodiment, rib 58 is positioned closer to first lateral side 34 than second lateral side 36. In this way, first, or forward, cavity 38a has a smaller volume than second, or aft, cavity 38b. In this variation, the area of the cross-section of forward cavity 38a is smaller than the area of the cross-section of aft cavity 38b. The cross-sections may be substantially rectangular.

In a variation of the present embodiment, rib 58 is devoid of the plurality of openings 60 and forward and aft cavities 38a and 38b are sealed from each other, enabling development of different cooling pressures therein.

In an additional embodiment a gas turbine engine comprises a housing; at least one compressor positioned within the housing; at least one turbine operably coupled to the at least one compressor and including a plurality of blades extending radially from a longitudinal axis of the engine; and a seal segment positioned along a portion of the housing and comprising: a radially outer wall; a radially inner wall; and a rib member extending between the outer wall and the inner wall.

In one example of the present embodiment, the outer wall has a first length extending annularly around a portion of the engine; the inner wall is positioned intermediate the outer wall and the portion of the engine and has a second length; and the rib member extends along the first and second lengths.

In one example of the present embodiment, the rib member is integral with the outer wall and the inner wall.

In one example of the present embodiment, the seal segment further comprises a first lateral wall extending between the outer wall and the inner wall and a second lateral wall extending between the outer wall and the inner wall, wherein the rib member extends intermediate the first and second lateral walls.

In one example of the present embodiment, the inner wall is positioned intermediate the outer wall and at least one of the at least one compressor or the at least one turbine, the seal segment further comprising: a first cooling passage bounded by the outer wall, the inner wall, the rib member, and the first lateral wall; and a second cooling passage bounded by the outer wall, the inner wall, the rib member, and the second lateral wall. In one variation, a volume of the first cooling passage is greater than a volume of the second cooling passage.

In one example of the present embodiment, the outer wall has a first length extending annularly around a portion of the engine and the inner wall has a second length extending annularly around the portion of the engine, and the rib member includes a plurality of rib sections positioned along the first and second lengths.

In one example of the present embodiment, the rib member includes a plurality of openings configured to permit flow of cooling gases between the first and second cooling passages through the openings.

In one example of the present embodiment, the inner wall is positioned intermediate the outer wall and the blades of the turbine, wherein the outer wall, the inner wall, the rib member, and the first lateral wall define a first cross-section of the seal segment, and the outer wall, the inner wall, the rib member, and the second lateral wall define a second cross-section of the seal segment. In one variation, an area of the first cross-section is greater than an area of the second cross-section. In one variation, the first cross-section comprises an elongate shape. In one example, the elongate shape is substantially rectangular. In one example, the substantially rectangular shape comprises rounded corners.

In one example of the present embodiment, a distance between the first lateral wall and the rib member is greater than a distance between the second lateral wall and the rib member.

In one example of the present embodiment, the outer wall has a first length extending annularly around a portion of the engine and the inner wall has a second length extending annularly around the portion of the engine, and the rib member extends continuously along the first and second lengths.

In one example of the present embodiment, the seal segment is comprised of a plurality of fabric layers.

In one example of the present embodiment, the seal segment is comprised of a three-dimensional woven structure.

In one example of the present embodiment, the outer wall includes at least one aperture configured to receive a connector member.

In one example of the present embodiment, at least the radially inner wall is comprised of a ceramic material.

While the invention herein disclosed has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A gas turbine engine, comprising:
   a housing;
   at least one compressor positioned within the housing;
   at least one turbine operably coupled to the at least one compressor and including a plurality of blades extending radially from a longitudinal axis of the engine; and
   a seal segment positioned along a portion of the housing and comprising:
      a radially outer wall having a first length extending annularly around a portion of the engine, the radially outer wall including at least one elongate aperture extending along a width of the seal segment and defining a slot on and through the radially outer wall configured to receive a connector member;
      a radially inner wall positioned intermediate the outer wall and the portion of the engine and having a second length, the radially outer wall comprised of ceramic matrix composite material;
      a first lateral wall and a second lateral wall, extending between the outer wall and the inner wall;
      a rib member integrally formed with and extending between the outer wall and the inner wall intermediate the first and second lateral walls without overlapping the at least one elongate aperture of the outer wall;
      a first cooling passage bounded by the outer wall, the inner wall, the rib member, and the first lateral wall; and
      a second cooling passage bounded by the outer wall, the inner wall, the rib member, and the second lateral wall, the second cooling passage having a smaller cross-section than the first cooling passage.

2. The engine of claim 1, wherein a distance between the first lateral wall and the rib member is greater than a distance between the second lateral wall and the rib member.

3. The engine of claim 1, wherein the rib member includes a plurality of openings configured to permit flow of cooling gases between the first and second cooling gas passages through the openings.

4. The engine of claim 1, wherein at least the radially inner wall is comprised of a ceramic material.

5. The gas turbine engine of claim 1, further comprising a connector member including a shaft connected to an inner end, wherein the inner end is sized and configured to be received through the slot and to straddle the slot after being rotated, and wherein the connector member supports the seal segment when the inner end straddles the slot.

6. A gas turbine engine, comprising:
   a housing;
   at least one compressor positioned within the housing;
   at least one turbine operably coupled to the at least one compressor and including a plurality of blades extending radially from a longitudinal axis of the engine; and
   a seal segment positioned along a portion of the housing and comprising:
      a radially outer wall including at least one elongate aperture extending along a width of the seal segment and defining a slot on and through the radially outer wall configured to receive a connector member;
      a radially inner wall positioned intermediate the outer wall and at least one of the at least one compressor and the at least one turbine, the radially outer wall comprised of ceramic matrix composite material;
      a first lateral wall extending between the outer and inner walls;
      a second lateral wall extending between the outer and inner walls;
      a rib member integrally formed with and extending between the outer wall and the inner wall and intermediate the first and second lateral walls without overlapping the at least one elongate aperture of the outer wall;
      a first cooling passage bounded by the outer wall, the inner wall, the rib member, and the first lateral wall; and
      a second cooling passage bounded by the outer wall, the inner wall, the rib member, and the second lateral wall, the second cooling passage having a smaller cross-section than the first cooling passage.

7. The engine of claim 6, wherein a volume of the first cooling passage is greater than a volume of the second cooling passage.

8. The engine of claim 6, wherein a distance between the first lateral wall and the rib member is greater than a distance between the second lateral wall and the rib member.

9. The engine of claim 6, wherein the outer wall has a first length extending annularly around a portion of the engine and the inner wall has a second length extending annularly around the portion of the engine, and the rib member extends continuously along the first and second lengths.

10. The engine of claim 6, wherein the outer wall has a first length extending annularly around a portion of the engine and the inner wall has a second length extending annularly around the portion of the engine, and the rib member includes a plurality of rib sections positioned along the first and second lengths.

11. The engine of claim 6, wherein the rib member includes a plurality of openings configured to permit flow of cooling gases between the first and second cooling passages through the openings.

12. The gas turbine engine of claim 6, further comprising a connector member including a shaft connected to an inner end, wherein the inner end is sized and configured to be received through the slot and to straddle the slot after being rotated, and wherein the connector member supports the seal segment when the inner end straddles the slot.

13. A gas turbine engine, comprising:
   a housing;
   at least one compressor positioned within the housing;
   at least one turbine operably coupled to the at least one compressor and including a plurality of blades extending radially from a longitudinal axis of the engine; and
   a seal segment positioned along a portion of the housing and comprising:
      a radially outer wall including at least one elongate aperture extending along a width of the seal segment and defining a slot on and through the radially outer wall configured to receive a connector member;
      a radially inner wall positioned intermediate the outer wall and the blades of the turbine, the radially outer wall comprised of ceramic matrix composite material;
      a first lateral wall extending between the outer and inner walls;
      a second lateral wall extending between the outer and inner walls; and
      a rib member integrally formed with and extending between the outer wall and the inner wall and intermediate the first and second walls without overlapping the at least one elongate aperture of the outer wall, wherein the outer wall, the inner wall, the rib member, and the first lateral wall define a first rectangular cross-section of the seal segment, and wherein the outer wall, the inner wall, the rib member, and the second lateral wall define a second rectangular cross-section of the seal segment.

14. The engine of claim 13, wherein an area of the first rectangular cross-section is greater than an area of the second rectangular cross-section.

15. The engine of claim 13, wherein the first cross-section has an elongate shape.

16. The engine of claim 15, wherein the elongate shape is substantially perpendicular.

17. The engine of claim 13, wherein a distance between the first lateral wall and the rib member is greater than a distance between the second lateral wall and the rib member.

18. The engine of claim 13, wherein the outer wall has a first length extending annularly around a portion of the engine and the inner wall has a second length extending annularly around the portion of the engine, and the rib member extends continuously along the first and second lengths.

19. The engine of claim 13, wherein the seal segment is comprised of a plurality of fabric layers.

20. The engine of claim 13, wherein the seal segment is comprised of a three-dimensional woven structure.

21. The gas turbine engine of claim 13, further comprising a connector member including a shaft connected to an inner end, wherein the inner end is sized and configured to be received through the slot and to straddle the slot after being rotated, and wherein the connector member supports the seal segment when the inner end straddles the slot.

* * * * *